(12) United States Patent
Swan et al.

(10) Patent No.: US 7,774,032 B2
(45) Date of Patent: Aug. 10, 2010

(54) VIDEO BABY MONITOR SYSTEM WITH BATTERY BACK-UP

(75) Inventors: Jeffrey Swan, West Chester, PA (US); Craig Desrosiers, Spring City, PA (US); Fa-Yun Zhang, Hui Zhou (CN)

(73) Assignee: Graco Children's Products Inc., Atlanta, GA (US)

( * ) Notice: Subject to any disclaimer, the term of this patent is extended or adjusted under 35 U.S.C. 154(b) by 659 days.

(21) Appl. No.: 11/697,266

(22) Filed: Apr. 5, 2007

(65) Prior Publication Data

US 2007/0287394 A1 Dec. 13, 2007

Related U.S. Application Data

(60) Provisional application No. 60/789,816, filed on Apr. 5, 2006.

(51) Int. Cl.
*H04M 1/00* (2006.01)
(52) U.S. Cl. ............... 455/575.3; 455/127.5; 455/519; 455/550.1; 340/539.15
(58) Field of Classification Search ............. 455/127.1, 455/127.5, 507, 517, 519, 550, 575.1–575.4; 340/539.1, 539.15
See application file for complete search history.

(56) References Cited

U.S. PATENT DOCUMENTS 7,049,968 B2 * 5/2006 Fitzgerald et al. ........ 340/573.1

| 2002/0098859 | A1 * | 7/2002 | Murata ..................... 455/522 |
| 2003/0214601 | A1 | 11/2003 | Yuen |
| 2004/0132489 | A1 | 7/2004 | Ryley et al. |
| 2004/0135879 | A1 | 7/2004 | Stacy |
| 2006/0099969 | A1 * | 5/2006 | Staton et al. ............. 455/456.4 |

FOREIGN PATENT DOCUMENTS

| EP | 1 185 104 | 3/2002 |
| EP | 1 515 556 | 3/2005 |

OTHER PUBLICATIONS

Instruction Manual for Baby's Quiet Sounds handheld video monitor with night vision by Summer, 2005.
User guide for Color-View Video Monitor by Safety $1^{st}$, 2004.
International Search Report and Written Opinion issued in related International application No. PCT/US2007/066116 issued Nov. 14, 2007.

* cited by examiner

*Primary Examiner*—Nhan Le
(74) *Attorney, Agent, or Firm*—Lempia Braidwood LLC (57) ABSTRACT

A video baby monitor system has a child unit with a back-up battery, a video camera, a microphone, and a transmitter configured to transmit video signals representing video images sent from the camera and audio signals representing sounds sent from the microphone. A parent unit having a receiver for receiving the video signals and the audio signals, a video screen for displaying the video images, and a speaker for emitting the sounds. The child unit is configured to operate on primary power from an external power source and to operate on back-up power from the back-up battery source. The monitor system is configured to switch from the primary power to the back-up power and to deactivate at least one video function upon detecting a loss of the primary power.

21 Claims, 6 Drawing Sheets

VIDEO BABY MONITOR SYSTEM WITH BATTERY BACK-UP

RELATED APPLICATION DATA

This patent is related to and claims priority benefit of U.S. Provisional Patent Application Ser. No. 60/789,816, which was filed on Apr. 5, 2006, and which was entitled "Video Baby Monitor System."

BACKGROUND OF THE INVENTION

1. Field of the Disclosure

The present invention is generally directed to baby monitor systems, and more particularly to a video baby monitor system with a battery back-up and power consumption features.

2. Description of Related Art

Baby monitor systems are known in the art, including those that offer video monitoring of a child. These systems typically have a child unit or multiple child units that plug into a wall and function on an alternating current (AC) power supply. The parent unit or multiple parent units also most typically are plugged into a wall remote from the child unit and operate on AC power. Many audio monitor systems are also known in the art that operate in much the same way, other than offering only audio transmission capability.

A number of audio monitor systems (no video capability) have a direct current (DC) battery back-up for the child unit in the event of an electrical power failure. The DC batteries can often last for several hours or more because they are only drawing power for audio signal transmission. There are known video transmitters that also can operate on back-up batteries. However, if AC power is lost such as during a power outage, video transmission continues when the child unit converts to battery back-up. Products of this type may utilize infra red light emitting diodes (IR LEDs) or other high power consumption components. In such a case, the battery life can be severely limited.

Known video monitor systems typically offer only two choices. One is to provide no battery back-up at all in case of a power outage. Thus, during a power outage, the monitor system does not function and transmits neither video nor audio information. The other is to provide battery back-up which continues transmitting both video and audio information, and thus continues to illuminate the IR LEDs or other high power consumption video transmission components. The first option does not allow the caregiver to continue monitoring the child during a power failure. The second option allows the caregiver to continue monitoring during a power failure, but the severely reduced battery life does not permit monitoring on back-up batteries for very long.

Existing video monitor systems also typically employ a parent unit similar in design to other audio monitoring systems. The units are generally planar in configuration and typically house the video display screen, the sound lights, and the speaker in the front of the parent unit. These types of units are not particularly portable, even if marketed as such. This is because the units do not tend to work well, unless the unit is placed in a stationary position with the front panel pointing in the direction of the user. The front of the unit must be directed at the user in order for the user to see the screen and here sounds emitted from the speaker. Additionally, the display screen continually is exposed to the surrounding environment during transport and also during use and non-use. Thus, the display screen on the typical parent unit is always susceptible to damage.

There are known video baby monitor systems provided with a relatively large liquid crystal display (LCD) screen. The large LCD screen is a positive consumer feature because the parent can easily see and monitor their child. However, these units are typically quite large as a result of the planar screen design, the position of the LCD on the front of the unit, and the location of the speaker and battery compartment. In addition, some video systems are marketed as having parent units that are portable because the parent unit is provided with a belt clip. However, with a standard parent unit design, the parent unit must be entirely removed from the user's belt in order for them to see the screen and the sound lights, which are also on the front of the device. The parent units are typically also quite large because of their configuration and, thus, can be cumbersome when worn on a person's belt. Thus, even when removed from the belt, the unit can be difficult to handle. Also, a user can not view or monitor their child when the unit is being transported on their belt or pants pocket because the screen would typically be facing their leg or facing outward from their leg.

Known infant or baby video monitor systems are offered with a number of features and functional parameters and thus have a number of settings that the user can adjust. A typical method of adjusting settings on existing video baby monitor systems utilizes similar methods and components employed on conventional audio monitor systems. In one example, a potentiometer-type switch or roller is provided to control and adjust volume or LCD screen brightness. In another example, a slide switch is provided on the side or front of the unit to select the appropriate operation channel or transmission frequency. In a further example, separate push buttons are provided on the unit housing to turn the units on and off, to turn the LCD screen on and off and sometimes to adjust the screen brightness up or down. Adding more features to such systems might improve the overall function of a video monitor system. However, the added features likely will also results in adding more components to the units and more actuators to the exterior housing of the units. The units can simply become more and more complicated to operate and more complex and expensive to manufacture.

Another problem with known video baby monitor systems is in properly positioning the child unit and it's camera within the baby's room. Positioning the unit can result in a compromise for the caregiver. If the child unit is positioned to provide a full view of the crib,. the infant would typically only take up a small portion of the parent unit screen. If the child unit is positioned closer to the crib to provide a larger image of the child on the parent unit screen, the infant may ultimately move out of the camera's viewing range. Thus, a parent would not be able to see their child.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

The video baby monitor system disclosed and described herein solves or improves upon one or more of the above noted and other problems and disadvantages with prior known video baby monitor systems. In one example, the disclosed system is configured so that the parent unit can, during an AC power failure, remain connected with the child unit and continue to receive audio of their child. In another example, a parent can do so for a much longer period of time while running on back-up batteries. In another example, the disclosed system employs a relatively large LCD screen so that the child can be easily seen by the user. In the disclosed system, the parent unit is rendered truly portable by reconfiguring the unit's housing, as well as the various components on the unit, including the LCD screen. In a further example, the disclosed parent unit LCD screen is protected from damage when being transported and/or when not in use.

In yet another example, the disclosed system presents various settings and adjustment options to the user in a different way compared to prior known systems. In one example, the LCD screen can display information pertinent while the user sets or adjusts different parameters of the system. In another example, a multi-function button arrangement is provided on the parent unit to scroll through different displayed options and to select and adjust settings for each option. The disclosed parent unit thus significantly reduces the complexity of the parent unit housing while improving its overall function and performance. In yet another example, the disclosed system offers adjustable camera zoom and pan capability so that a caregiver select and change the image viewed on the parent unit screen. Thus, the child unit can be placed in the environment of the child without compromise to the image displayed on the parent unit.

Figure 1:
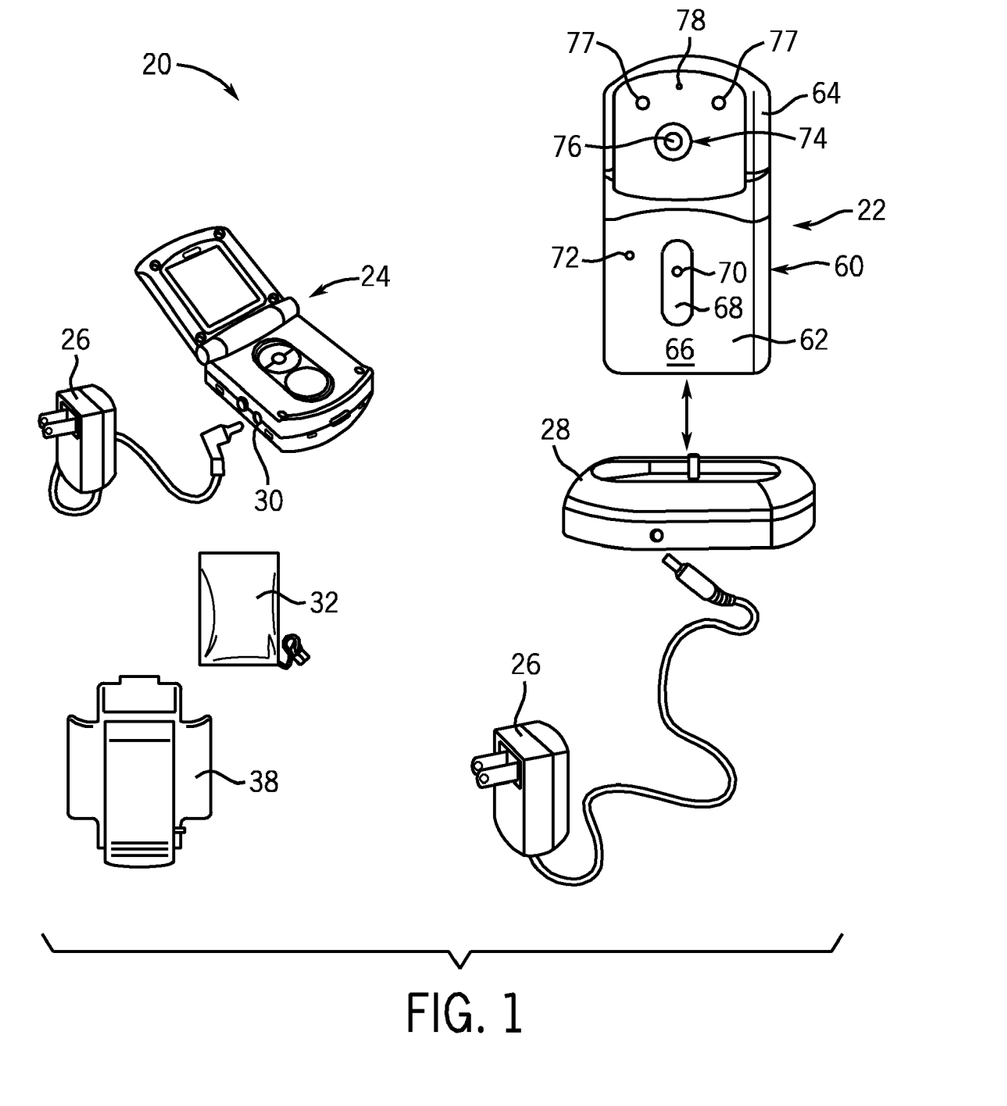
FIG. 1 shows an exploded view of one example of a video baby monitor system with components constructed in accordance with the teachings of the present invention.

Tuning now to the drawings, FIGS. 1 generally shows a video baby monitor system 20 constructed in accordance with the teachings of the present invention. The disclosed monitor system 20 includes at least one nursery or child unit 22 that picks up and transmits audio information and that captures and transmits video information. The system 20 also includes at least one receiver or parent unit 24 that receives the audio and video information from the nursery unit 22. In one example, the parent and child unit can be in direct communication with one another as is known in the art.

As is known in the art, the units can normally run on AC power. The system 20 can include one or more AC power adapters 26, one for each of the parent units 24 and the child units 22. As will be evident to those having ordinary skill in the art, fewer or more than one parent unit 24 and/or child unit 22 can be provided with the overall system 20 without departing from the spirit and scope of the present invention. There may be instances where one aspect or feature disclosed herein would be equally suitable in a monitor system that employs more than one parent or child unit.

As is know in the art, a docking station or base 28 can also be provided with the parent unit 24, the child unit 22, or both. As shown for this example in FIG. 1, the child unit 24 has such a docking station. Each base 28 can be configured to receive the appropriate unit and to connect via the AC adapter 26 to an AC power source as is known. In the alternative, either or both of the parent and child units can be provided with an AC adapter jack for direct coupling to the AC adapter 26, if desired. As shown for this example in FIG. 1, the parent unit 24 is provided with such an adapter jack 30 for directly connecting the unit to the AC adapter 26.

A rechargeable battery pack 32 can also be provided for either or both of the parent and child units 24 and 22. If rechargeable batteries 32 are used in either of the units the base docking station 28 can be used to recharge those batteries while the unit is docked. Alternatively, either or both of the parent and child units 24 and 22 in the disclosed example can be configured to accept standard alkaline or other disposable DC batteries 34 (see FIG. 2). Use of DC batteries on the parent unit 24 can be particularly useful when a caregiver wishes to carry the parent unit with them as they move about. Thus, there is likely a greater need to use rechargeable batteries 32 on the parent unit, which can be regularly recharged using the adapter 26 connected to the jack 30.

Figures 2, 3, 6:
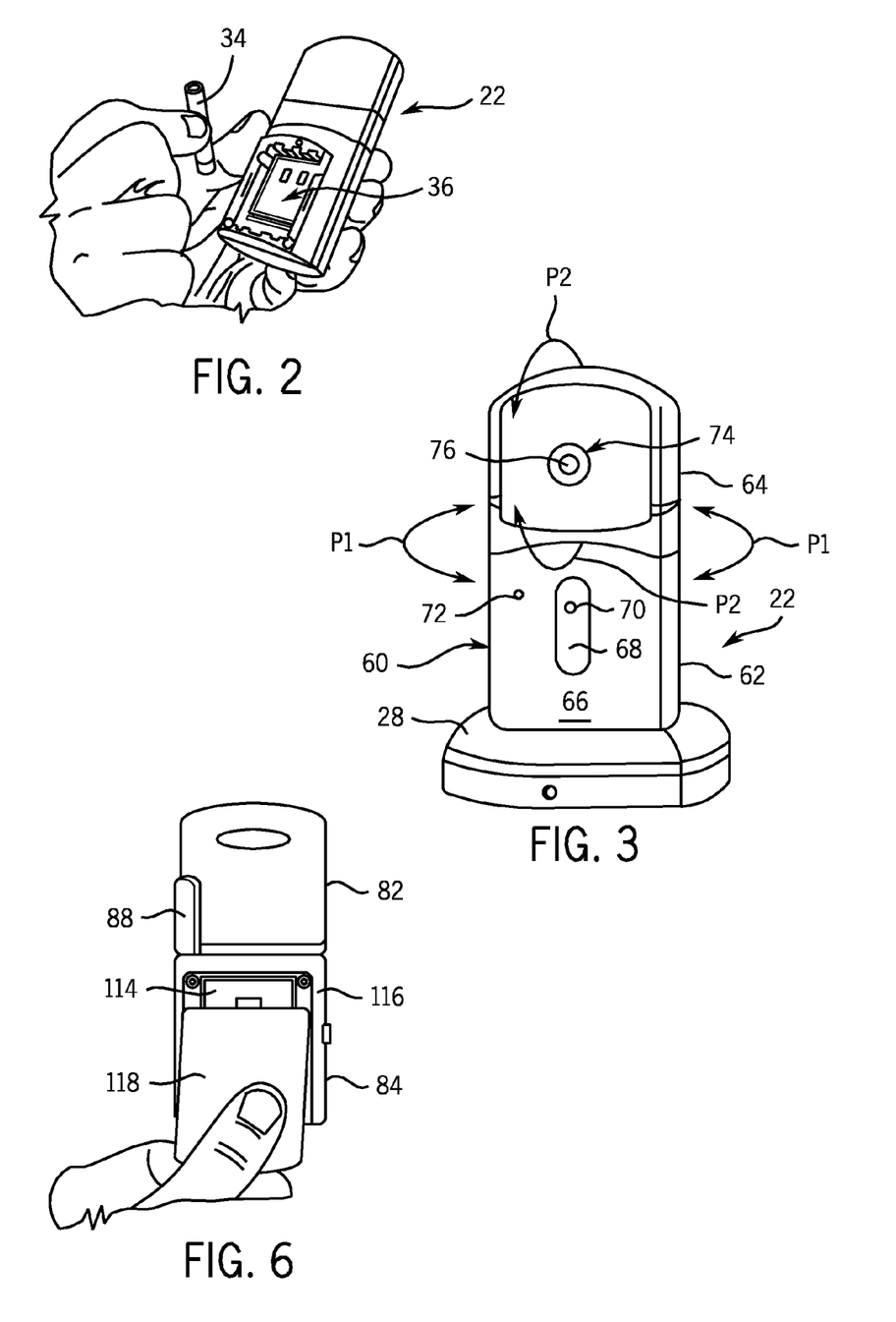
FIG. 2 is a rear perspective view of the child unit of the system shown in FIG. 1 and depicted as having its back-up batteries replaced.
FIG. 3 is a front perspective view of the child unit of the system shown in FIG. 1 and placed on its docking station.
FIG. 6 is a rear perspective view of the parent unit of the system shown in FIG. 1 and is shown having its battery door removed.

In contrast, the child unit 22 is intended to typically stay in a static location during use. Thus, the docking station 28 can be employed, the child unit can be docked, and the station can be plugged into an AC power source using the adapter 26. Under most circumstances the child unit 22 will operate on AC power. However, it will occasionally be desirable to the caregiver that the child unit 22 continues to function in the event of a loss of AC power. Thus, the child unit 22 may be provided with a receptacle 36 for receiving back-up batteries as shown in FIG. 2. The child unit 22 may be more likely to be configured to accept standard alkaline batteries 34, which can be retained in the battery receptacle 36 in the unit and covered by a removable battery door (not shown), in the event of such an emergency. The batteries in the child unit, however, can certainly be rechargeable if desired.

As shown in FIG. 1, the system 20 can also incorporate a belt clip or attachment device 38. The device 38 can be configured to attach the parent unit 24 to an object, such as on a waist belt of a caregiver. Thus, the parent unit 24 in the disclosed example is intended to be a portable receiver that can be carried with a caregiver and yet function as intended.

As shown in FIG. 1, the child unit 22 generally has an exterior housing 60 with a lower portion 62 and an upper portion 64 that is coupled to and positioned on top of the lower portion. The child unit 22 in this example has a front surface 66 and includes an ON/OFF button 68 positioned generally centrally in the front surface 66 of the lower portion 62. In the disclosed example, a power light emitting diode (LED) 70 is positioned on a portion of the button 68. The LED 70 indicates when illuminated that power is turned on for the unit. As will be evident to those having ordinary skill in the art, the position, shape, and orientation of the housing 60, button 68, and LED 70 can vary considerably and yet fall within the spirit and scope of the present invention. For example, the LED need not be on the button and both can be placed virtually anywhere on the housing 60 of the child unit 22 as desired.

The child unit 22 also has a microphone opening 72 on the front surface 66 of the housing lower portion 62. A microphone is disposed behind the opening 72 in the housing 60. The opening 72 allows the microphone to pick up sounds being emitted in the vicinity of the unit.

A video camera 74 is generically depicted in FIG. 1 as being housed within the upper portion 64 of the child unit housing. The video camera 74 in the disclosed example has a camera lens 76 and a plurality of infrared light emitters 77, such as IR LEDs, that are exposed to the front surface 66 in the housing. The video camera 74 can be adjustable relative to the position of the housing 60 so that the camera lens 76 can be aimed at an intended target. The IR emitters 77 can be provided to permit the camera to pick up images at night or in low ambient light. In one example, the child unit 22 can be provided with an ambient light sensor 78 that is also exposed on a surface of the unit. The sensor 78 can be configured to sense ambient light levels and/or to detect a low ambient light threshold. The child unit can be configured so that the IR emitters 77 are activated below the threshold level and deactivated when ambient light is above the threshold level. The camera 74 can operate normally above the threshold level without the need for IR lighting.

In one example, the upper portion 64 of the housing is movable relative to the lower portion 62. As depicted generally in FIG. 3 by the arrows P1 and P2, the upper portion 64 can be rotated or swiveled either to the left or right relative to the lower portion 62 and can be pivoted forward or rearward relative to the lower portion of the housing 60 as well. Thus, in this example, the housing moves to accommodate positioning and aiming of the video camera 74. In another example, the housing 60 can be entirely stationary. The video camera itself can be coupled to a device or motor that is manipulated electronically to direct and aim the video camera 74.

Figure 4:
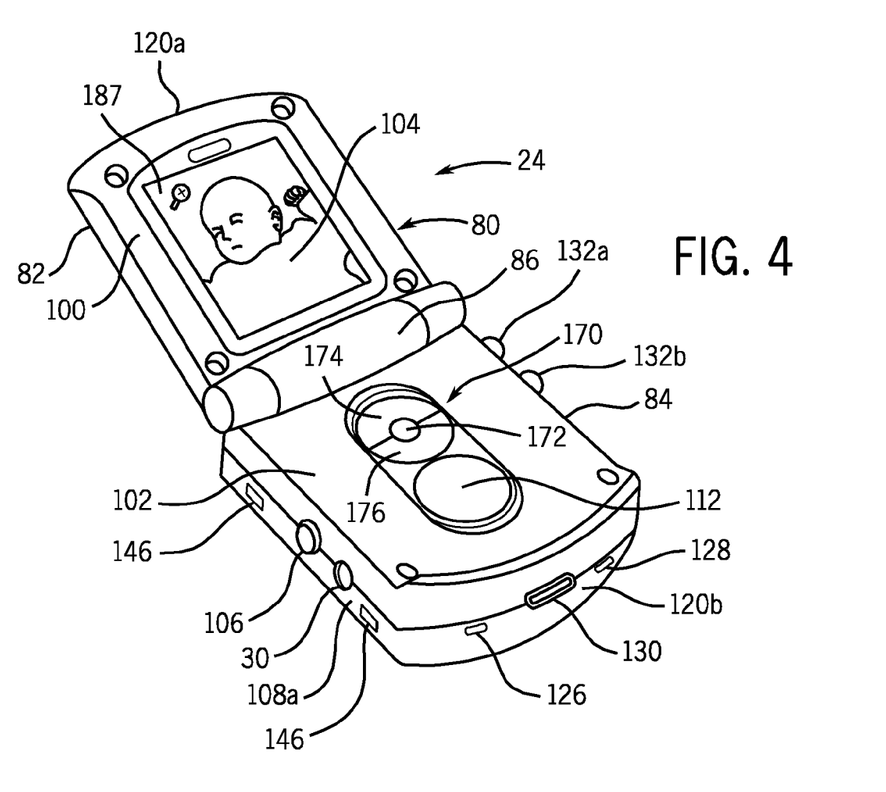
FIG. 4 is a perspective view from one side of the parent unit of the system shown in FIG. 1 and in an open position or configuration.
Figure 5:
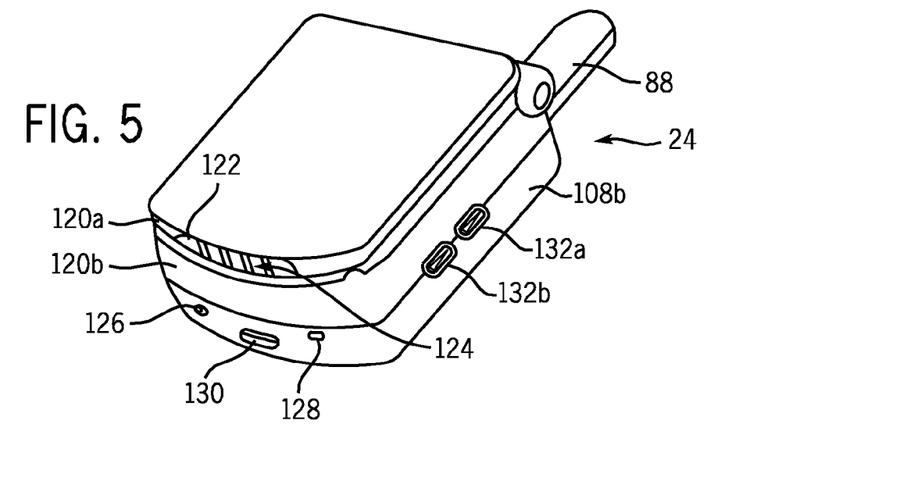
FIG. 5 is a perspective view from the other side of the parent unit shown in FIG. 4 and in a closed position or configuration.

The parent unit 24 in the disclosed example is illustrated in greater detail in FIGS. 4 and 5. In one aspect of the present invention, the disclosed parent unit 24 has a two part housing assembly 80. The housing assembly has a first section or flip section 82 and a second or base section 84. In the disclosed example, a hinge or joint 86 is positioned along mating edges of the two sections 82 and 84. The flip section 82 can be rotated or pivoted relative to the base section 84 to an open position as shown in FIG. 4. The flip section 82 can also be pivoted or rotated to a closed position as depicted in FIG. 5. A conventional antenna 88 is also provided on the housing assembly 80, and in this example extends from an edge of the base section that generally coincides with the location of the pivot joint 86.

Referring to FIG. 4, the parent unit in the open position has a front side defined in part by a viewing surface 100 disposed on one side of the flip section 82 and in part by a front surface 102 on a side of the base section 84. Together the viewing surface 100 and the front surface 102 face generally in the same direction with the housing assembly 80 in the open position and define the unit's font surface. When the housing assembly 80 is pivoted to the closed position shown in FIG. 5, the viewing surface 100 and the front surface 102 of the two housing sections confront one another and lie adjacent one another. A display screen 104 is provided on the viewing surface 100 on the flip section 82 in the disclosed example. The display screen can be any type of suitable screen technology and in one example is an LCD screen. The LCD screen 104 is visible with the unit in the open position. The LCD screen 104 and sandwiched between, hidden, and protected within the housing assembly 80 in the closed position.

In one aspect of the present invention, the two part housing assembly 80 permits the housing to be folded in half when not being used, when being transported, and there is no need to view the LCD screen 104 during use. As noted above, a large display screen is a desirable feature in a baby monitor system. The larger the screen, the better a parent or caregiver is able to see what is transpiring with their child being monitored. An LCD screen provides an adequate picture for use in video baby monitors, but the larger the screen the better the images can be viewed in this type of hand held unit environment. In conventional video monitors, all of the switches and buttons, the screen, the speaker, and other devices associated with the parent unit are provided on the front surface of the housing. This either reduces the available space for the screen, thus requiring a smaller screen size for a given housing size, or results in a larger housing. In the disclosed example, the housing assembly 80 can be folded in half and thus be rendered more portable. The unit will essentially be half as large as a conventional parent unit video monitor, except when opened. Thus, the disclosed unit can have a relatively large screen in proportion to the overall housing size. The disclosed unit can remain relatively small and highly portable and yet have a fairly large screen in comparison to conventional units. Unless a caregiver is actively viewing the LCD screen 104 and manipulating the features of the unit, the disclosed parent unit 24 provides this advantage. The LCD screen 104 can take up an entire half of the housing assembly 80 and yet the housing can be rendered quite small and portable when folded. The base section 84 of the housing assembly 80 can be utilized for all of the features and functions necessary to operate the parent unit 24.

In another aspect of the present invention, the parent unit 24 includes a plurality of added beneficial features provided by the housing assembly 80 as depicted best in FIGS. 4-6. For example, the parent unit 24 has a power ON/OFF button 106 that can turn the parent unit ON or OFF entirely. The button 106 is relatively small and provided on a side edge 108a of the base section 84 in this example. The AC adapter jack 30 is also provided on the same side 108a for connection to the AC adapter 26 in the disclosed example. A video ON/OFF button 112 is provided on the front surface 102 of the base housing section 84 and can be depressed to turn only the video LCD screen 104 ON or OFF without powering down the entire parent unit. As will be evident to those having ordinary skill in the art, the position, orientation, shape, and other aspects of the housing assembly 80 and the ON/OFF button 106, the jack 30, and the video ON/OFF button 112 can vary and yet fall within the spirit and scope of the present invention.

In the disclosed example as shown in FIG. 6, a battery receptacle 114 is positioned on the back side 116 of the base section 84 and covered by a cover 118. The battery receptacle 114 is on the base section, which also leave more housing volume, i.e., the entire flip section 82, for committing a large LCD screen 104.

Each of the housing flip and base sections 82 and 84 has a free edge 120a and 120b, respectively. The free edges 120a and 120b are opposite the joined edges of the two sections 82 and 84 carrying the hinge 86 and in the disclosed example define an exposed end surface on the housing assembly 80. In the disclosed example, a connection light 122 and a plurality of sound lights of a light bar 124 are provided on the free edge 120a of the flip section 82. The connection light 122 and sound light bar 124 can operate in a conventional manner and are located in an advantageous position on the housing according to the invention. Specifically, the connection light 122 will illuminate in a manner indicating to the caregiver that connection is made with the child unit 22. In one example, the connection light 122 can be a dual-color red/green LED. In another example, two different colored LED's can be placed side-by-side, one being red and one being green, on the edge 120*a*. The connection light 122 can illuminate red when no connection exists between the parent and child units, and illuminate green when a satisfactory connection exists. Similarly, the sound light bar 124 operates in a conventional manner but again is advantageously positioned on the edge 120*a* in accordance with the invention. In one example, the light bar 124 progressively illuminates to indicate the audio level being picked up by the child unit 22. The more lights illuminated, the louder the sound and the fewer lights illuminated the quieter the sound being picked up. Alternatively, the light bar 124 can illuminate in a manner that represents other characteristics of the sound being monitored, such as how frequently the baby makes a sound.

A pair of lights is provided on the free edge 120*b* of the base section 84 in this example. One of the lights is a battery level indicator light 126 and the other of the lights is a battery charging status light 128. The presence or absence and the features of these two battery lights on the disclosed parent unit 24 can vary considerably and yet fall within the spirit and scope of the present invention. If present, the battery level light 126 can be a dual-color LED or have two separate LEDs, one color being red and the other color green. In one example, the light 126 can illuminate green when the batteries are sufficiently charged and red when the batteries are low and require recharging. Similarly, the battery charge light 128 can also be a dual-color LED or incorporate two different color LEDs. In the disclosed example, the battery charging light 128 can illuminate red during a battery charging cycle and illuminate green when the battery charging cycle is completed and the batteries 32 are fully charged. As will be evident to those having ordinary skill in the art, the level and charge lights 126 and 128 can also be combined into a single function light or light combination instead of being provided as two separate indicators on the unit.

A speaker is also provided in the housing base section 84 and an opening 130 is provided for the speaker in the free edge 120*b* of the base section. The speaker will emit sound through the speaker opening 130 so that a caregiver can hear the audio transmission from the child unit 22. In the disclosed example, a pair of volume UP/DOWN buttons 132*a* and 132*b*, respectively, are provided on the opposite side edge 108*b* on the base section 84. In this example, the caregiver can use the volume UP/DOWN buttons to raise or lower the speaker volume level of the parent unit 24, depending upon their needs at a particular time.

Referring again to FIGS. 4 and 5, the free edges 120*a* and 120*a* of the housing sections 82 and 84 lie facing in the same direction when the unit is in the closed position. The connection light 122, light bar 124, battery level indicator 126, battery charge light 128, and speaker opening 130 are all facing in the same direction, positioned on the exposed edges 120*a* and 120*b* with unit 24 closed. Similarly, the volume UP/DOWN buttons 132A and 132B and the power ON/OFF button are positioned on the side edges 108*b* and 108*a* of the base section and are also exposed when a unit closed. Thus, with the unit closed, a caregiver can still view and ascertain the status of the battery, the status of the child/parent unit connection, the intensity of sounds emitted from the speaker. The caregiver can also turn the unit ON or OFF, adjust volume UP or DOWN, listen to the speaker.

Figure 7:
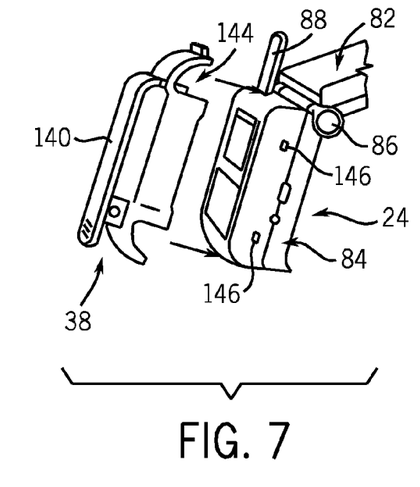
FIG. 7 is an exploded view of the parent unit and the belt clip of the system shown in FIG. 1.
Figure 8:
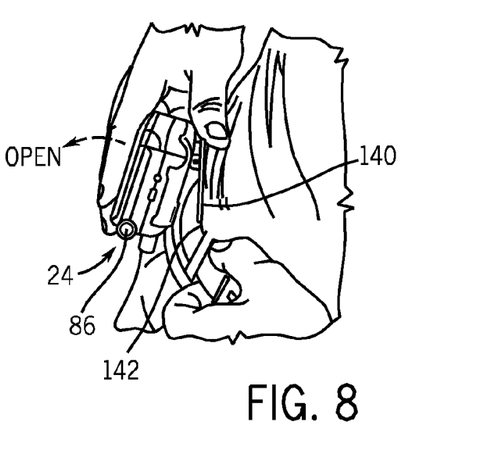
FIG. 8 is a perspective view of the assembled belt clip and parent unit of FIG. 7 and shown being attached to a user's belt.

Yet another aspect of the invention is illustrated with reference to FIGS. 7 and 8. The belt clip 38 has a clip part 140 that includes jaws which open downward to clip onto a wearer's belt 142. The belt clip 38 also includes a receptacle bracket 144 coupled to the jaws and sized to receive the base section 84 of the parent unit 24 as shown. Detents or recesses 146 can be provided on the edges 108*a* and 108*b* of the base section 84. Corresponding dimples or protrusions (not shown) can be provided on the interior of the receptacle to assist in retaining the parent unit 24 in the belt clip 38 when installed. As shown in FIG. 8, when the parent unit 24 is attached to the belt clip 38 and belt clip is attached to a wearer's belt 142, the hinge or joint 86 is positioned downward and the parent unit is positioned with the free edges 120*a* and 120*b* of the housing assembly 80 facing upward. In this orientation, the parent unit 24 in the present example provides significant advantages to the caregiver.

First, a caregiver need only look down to view and ascertain the battery status and see the light bar to determine the emitted sound intensity. The caregiver can also review the status of the connection between the parent unit 24 and child unit 22 simply by looking down at the connection light 122 exposed on the free edge of the unit. The caregiver need only reach down to turn the unit ON or OFF and to adjust the speaker volume UP or DOWN. The caregiver need to nothing but listen for sounds emitted by the speaker, which is facing upward toward their ear. Neither the unit nor the belt clip need be removed to perform these functions.

Second, with the hinge or joint 86 positioned at the bottom of the portable unit, the flip section 82 can be rotated outward while the parent unit 24 and belt clip 38 remain attached to the wearer's belt 142. Thus, if the caregiver wishes to view the LCD screen 104 and see the child being monitored, the caregiver need only rotate the flip section outward to do so. Again, the caregiver need not remove the receiver unit 24 from the belt clip 38 or the belt clip 38 from their belt 142 to see the LCD screen 104. Other optional features, settings, and adjustments can also be offered on the exposed parts of the housing assembly when closed and mounted in the belt clip 38.

Third, the speaker is on the edge of the unit 24 and not on the front side. This leaves more housing volume available for placement of other components, options, and features. This leaves still further available space for a larger LCD screen on the housing assembly 80.

Thus, the parent unit 24 in the disclosed example provides protection for the display screen when the housing 80 is in the closed position. The parent unit 24 also permits viewing the display screen when the unit is being transported without removing the unit from a belt clip. The disclosed parent unit also permits operating the unit and ascertaining functional parameters without having to remove the unit from the belt clip or other attachment device. Additionally, the parent unit 24 in the disclosed example permits use of a larger LCD screen while maintaining a relatively small overall housing package rendering the parent unit truly portable.

In an alternative example, the housing can be configured with two halves that linearly slide between the closed and open positions while staying parallel to one another. The end surface or edge features noted above will be equally beneficial in such an arrangement. The sliding track could also be along a curved arc in which the on-belt viewing advantage would also be achieved. The housing sections could also pivot about a point while remaining parallel to one another and achieve one or more of the above-noted advantages and benefits.

Figure 9:
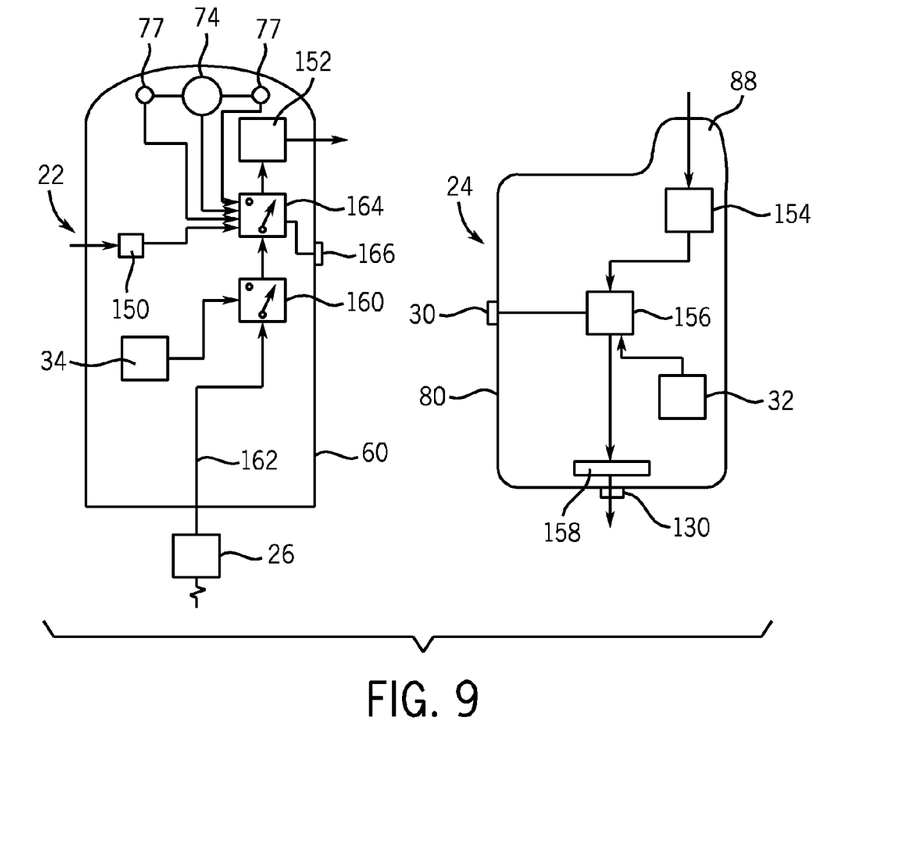
FIG. 9 is a schematic of one example of a parent unit and child unit of the system shown in FIG. 1.

In another aspect of the present invention, the disclosed monitor system 20 employs a battery back-up system that utilizes less battery power when operating on the back-up DC batteries. FIG. 9 is a simplified schematic depicting one example of the child unit 22 and the parent unit 24 of the disclosed system 20. The child unit in this example has a camera 74 and IR light emitters 77 as discussed previously. The child unit 22 also employs a microphone 150 positioned adjacent the microphone opening 72 described previously. The child unit 22 also employs a transmitter 152 that is capable of transmitting audio and video signals. The child unit 22 picks up sound through the microphone 150 and transmits appropriate signals representative of the sound to the parent unit. The child unit also picks up video images through the camera 74 and also transmits appropriate signals representative of the images to the parent unit 24.

The parent unit 24 generally has a receiver 154 capable of receiving both audio and video signals from the child unit 22. The receiver 154 is coupled to a microprocessor 156. The microprocessor can perform many functions, one of which is to separate the audio and video signals received by the receiver 154. The microprocessor 156 sends the audio signals to a speaker 158, which is positioned adjacent the speaker opening 130 in the housing 80. The microprocessor 156 can also send the video image signals to the LCD screen 104 of the parent unit 24. The LCD can show images representative of the video signals.

As shown in FIG. 9, the child unit 22 also employs a plurality of TR emitters 77, such as LEDs, associated with the camera 74. The emitters 77 are employed to illuminate a room when it is dark. The IR light is invisible to humans, so a baby would not be disturbed while it is sleeping. As noted previously, the IR emitters can be coupled to a light sensor that can effect activation or deactivation depending upon ambient light levels in the child's room. If the IR emitters are activated with higher ambient light levels, the picture color could be affected. Such IR emitters 77 consume significant power.

The child unit 22 includes a switch 160 associated with the transmitter 152 in this example. The switch 160 is coupled to both the external power source 162 and the back-up batteries 34. The switch 160 can be configured to select which power source is to be used to operate the child unit components. The child unit can optionally have its own microprocessor 164 that can perform various functions relating to the audio and video signals, the power supply, or other operational parameters of the unit.

It is known that occasional AC power loss can occur. This happens during storms or other uncommon power outages. A conventional monitor system would either stop functioning completely or would switch over to a battery back-up, but still operate the video monitor components and wear down the batteries very quickly. In the disclosed monitor system 20, the switch 160 is configured to immediately switch from AC power source upon detection of a power outage to the DC power source which functions as the battery back-up in this example. The transmitter 152 (or optionally the microprocessor 164) in the disclosed example can be configured to detect a change in the source of power. When the unit 22 detects that it is operating on back-up batteries 34, the transmitter 154 (or optionally the microprocessor 164) immediately ceases all video transmission function. The transmitter will cease sending image signals when operating on back-up batteries in the disclosed example. The transmitter (or optionally the microprocessor 164) can also disable the camera and/or the night vision function by turning off the camera, the IR emitters 77, or both. The unit 22 can also be configured to cease all video image processing in the microprocessor 164, if one is provided on the unit. Immediately ceasing some or all video functions will significantly reduce power consumption and thus increase battery life for the child unit 22 if a power outage occurs.

A caregiver may now notice that no video image can be viewed. This could be cause for concern. In the disclosed example, the child unit transmitter 152 is thus also configured to send a signal to the parent unit receiver 154. The parent unit microprocessor 156 in this example is configured to receive the signal indicating the change in power source at the child unit and emit and alert for the caregiver to recognize the change. In one example, the alert can be an audible alarm or other signal emitted from the speaker 158 that is recognizable to the caregiver as an indication of a power outage at the child unit 22. In another example, the light bar 124 or battery lights 126 and 128 can be employed either separately, instead or, or in conjunction with an audible alert, to indicate to the caregiver that a power outage has occurred and that no video transmission is presently being sent. In a further example, the video display screen 104 can be coupled to the microprocessor in a manner that it can provide a visual indication to the caregiver that the external power source or the AC power has been disconnected or lost at the child unit 22 and that the child unit is now operating on battery back-up. Any combination of the lights, speakers, and screen can be utilized as in form of alert to the caregiver.

As shown in FIG. 9, the AC circuit 162 in the child unit 22 can be configured so that it operates on DC power using one of the AC power adapters 26. The power adapter 26 converts the AC incoming power to DC power for the incoming external power 162. Upon interruption of the external power source 162, such as loss of AC power to the adapter 26, the switch will change over to back-up power The transmitter 154 will detect a drop in DC power from the switch. Detecting the power reduction signals the transmitter to immediately cease some or all video functions. In one example, the camera 74 can be left on since the camera alone may not draw much power. Similarly, the microprocessor 164, if provided, can be configured to continue processing both audio and video data, or to stop all video data functions. In a further example, the parent unit microprocessor can also be configured to cease processing all video data to conserve even more power. Back-up battery life can be significantly increased using the disclosed system and method.

The system can be provided with a manual override option. This option can permit a caregiver to reinstate all video functions even if the child unit is operating on back-up power. A switch 166 or other means to initiate manual override can be provided on either of the units 22 or 24.

In another aspect of the present invention, the monitor system 20 is configured so that the parent unit 24 can be used to control the size of the image viewable on the LCD screen 104. The parent unit 24 can be used to zoom in, zoom out, or pan an image. In the disclosed example, the camera and lens are of an inexpensive type wherein the lens has no mechanical zoom feature. Thus, the focal point of the camera 74 and lens 76 is non-adjustable in this example. The zoom capability is created by data and image information manipulation. The images captured by the camera 74 and lens 76 are picked up by the transmitter 152 in the child unit and transmitted to the receiver 154 of the parent unit 24. In this example, it is possible to zoom in on a child, zoom out, or to pan side to side or up and down. Since the camera and lens are incapable of performing these functions in the disclosed example, the image data must be manipulated to achieve these functions.

The camera 74 in the disclosed example can be a type that has a relatively wide field of view. Alternatively or additionally, once a user is familiar with the disclosed system 20, they can position the child unit 22 and its camera 74 at an appropriate location in the baby's room to yield maximum field of view desired. The zoom and pan functions can then be used to view portions or partial images of the full image. With that in mind, either the child unit 22 or the parent unit 24 in the disclosed example is configured to perform the desired zoom and pan features. Either the microprocessor 164 in the child unit or the microprocessor 156 in the parent unit can be configured with a mathematical algorithm and programming that work with the available full image data received from the child unit. The microprocessor can be configured to select a subset of the full image data to produce and create a partial or zoom image using the data subset. That partial image data can then be delivered in a format to fit the entire LCD screen 104.

Figure 10:
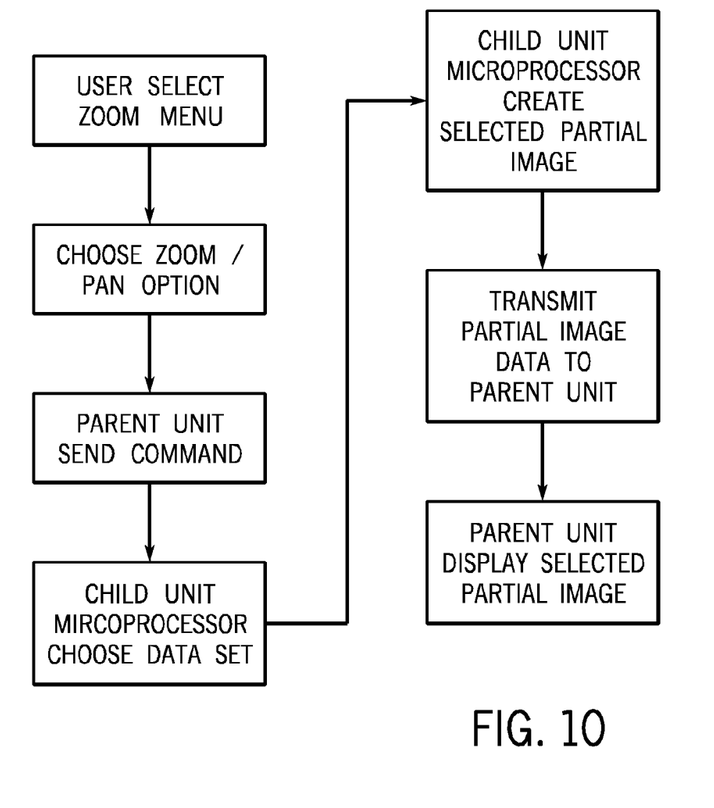
FIG. 10 is a flow chart depicting one example of a zoom in/zoom/out feature for the system shown in FIG. 1 in accordance with the teachings of the present invention.

FIG. 10 shows one example of a process for achieving zoom and pan functions in the disclosed baby monitor system. In one example, the parent unit 24 can send a command, initiated by the user, to the child unit 22 indicating selection of a zoom or pan function. The child unit processor 164 can perform the zoom function on the image data and then send the processed data to the parent unit 24 for display on the screen. In such an example, the amount of data sent to the parent unit 24 can be the same regardless of zoom state. In the disclosed example, the child unit microprocessor 164 (or optionally the parent unit processor 156) can be configured to perform frame-by-frame video adjustment using the algorithm. Each frame can then be displayed frame-by-frame on the LCD screen 104. Thus, the image can simulate an enlarged video image.

In this example, a selected fraction of the full image pixel information transmitted from the child unit 22 is selected and a partial image is generated based on the selected pixel subset. In the disclosed example, the camera 74 can be selected to have a much higher resolution than the resolution of the display screen 104. The processor selects a portion of the full image data and sends an image to the screen based on that data. Little or no loss in image quality will occur where the resolution of the partial image is still higher or equal to that of the screen.

A multi-function button arrangement 170 is depicted in FIG. 4 and is provided on the front surface 102 of the housing base section 84. The multi-function button arrangement 170 in this example includes a round central selection button 172 surrounded by a pair of half-moon shaped toggle or scroll buttons 174 and 176. As will be evident to those having ordinary skill in the art, the location, positioning, size, shape, and configuration of the button arrangement 170 can vary considerably and yet fall within the spirit and scope of the present invention. Also, the particular function of these buttons can also vary from that shown and described herein. In the disclosed example, the central selection button is identified as the OK button 172 and the toggle or selection buttons are identified as the UP or DOWN buttons 174, 176. However, the buttons and their functions can vary from that of the disclosed example.

As will be described in greater detail below with respect to another aspect of the present invention, a user can locate and select the zoom function using the OK button 172. Once the zoom mode is selected, the scroll buttons 174 and 176 can be used to choose from a plurality of selectable pan and zoom regions of the maximum viewable image (see FIG. 11E). Using the buttons 170, 172, and 174, the user can elect to zoom in at the view center of the normal video screen image. Alternatively, a user can select to pan to one of a plurality of quadrants or regions within the maximum viewable image and zoom in on that selected region. In FIG. 11E, there are four such quadrants aside from zooming in on the view center. The quadrants in this example essentially divide the viewing area into four equal off-center components and a center region. In one example of the present invention, a user can also select using the scroll buttons 174 and 176 the degree in which to zoom in on an image within a selected quadrant using the scroll buttons 174 and 176. Once a quadrant and degree of zoom is selected by a user, the microprocessor will select the appropriate pixel information for that quadrant and enlarge the view of only that selected information to fit the LCD screen. That information will then be sent to the LCD screen 104 and the images shown for viewing.

In the disclosed example, a user can select a view centered image or a diagonally panned image from the four corner quadrants of the fill image. The options shown herein are for images panned left and up, left and down, right and up, or right and down relative to the view center of the full image. In an alternative example, more or fewer zoom and/or pan options can be provided. Options for panning left and right only, up and down only, or other combinations can also be provided.

The zoom function can certainly be achieved in other alternative ways. For example, a more expensive camera and lens assembly can be employed in the child unit 22. The lens can be configured with mechanical zoom capability. The camera and lens can be equipped with appropriate motor controls to move the lens to zoom in or out. The child unit 22 can also employ the appropriate motor controls to pan up, down, left, or right. This can be done by moving the entire camera or by moving the entire upper portion 64 of the housing 60 to direct the camera in the appropriate pan direction. In such an example, the parent unit 24 can be provided with a remote control signal device that is coupled to the microprocessor 156. Using the multi-function button arrangement 170, the user can select the pan direction and amount as well as the zoom amount. The microprocessor can transmit the selected information to a parent unit transmitter, which then can send an RF or other appropriate signal to the child unit motion control devices to manipulate the camera and/or the housing. In one example, the child unit could also incorporate a receiver to receive the transmitted zoom and pan signal information from the parent unit. In another example, the camera and housing can employ separate devices that directly receive the signals transmitted from the parent unit. These direct zoom examples would be more complex and expensive, but would be capable of a wider zoom and pan range.

In another alternative example, the child unit 22 can be provided with its own microprocessor and receiver and a receiver and the parent unit 24 can be provided with a transmitter. User selections relevant to zoom and pan can be sent from the parent unit transmitter and received at the child unit. The algorithm calculations can be performed by the child unit microprocessor. The manipulated image data can then be sent from the child unit transmitter, having already been processed by the child unit microprocessor, to the parent unit receiver for display on the LCD screen. In a further example, a dedicated custom integrated circuit, such as a field-programmable gate array circuit (FPGA) or an application specific integrated circuit (ASIC) could be employed in the parent unit or more likely in the child unit. The dedicated integrated circuit can electronically control the camera and lens according to user input to manipulate zoom and pan functions and/or to perform algorithmic calculations on the image data to create zoom and pan effects on the information. As will be evident to those having ordinary skill in the art, additional methods and mechanisms can be utilized to perform the zoom function of the invention.

In another aspect of the present invention, a combination of the microprocessor 156, the display screen 104, and the multi-function button arrangement 170 can be utilized to provide an on-screen display function. The on-screen display can be programmed to permit adjusting, monitoring, and setting the various features, functions, and operational parameters of the monitor system 20. In conventional monitor systems, the various features and functions are adjusted manually using buttons and switches placed on the housing at various locations as noted above. The adjustments are made by any combination of sliding switches, pushing buttons, listening to audible commands and indicators, and viewing the light bar to make the appropriate selections and to set performance parameters for the various features and functions. In the disclosed example, the video screen 104 is utilized to assist in performing these tasks by displaying various selectable features and functions on the screen. The microprocessor 156 can be programmed to allow setting and controlling functions of the parent unit 24, to set up operational parameters of the system 20, and/or to do the same for one or more features and functions of the child unit 22.

One example of the on-screen display function of the present invention is disclosed and described herein with respect to the previously discussed zoom capability. As will be evident to those having ordinary skill in the art, more than one function can be part of the on-screen display. Also, the monitor system functions that can benefit from the on-screen display feature can vary considerably. In general, the video screen can operate in a monitoring mode or in an on-screen display or functional mode. In the monitoring mode, the screen can display real time images of those captured by the camera. In the on-screen mode, the screen can at least display operational parameter information. The screen can also be configured to display both at the same time, with on-screen display information overlaid onto the real time image.

Figure 11A:
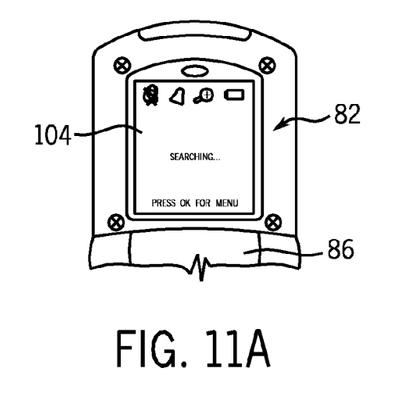
FIGS. 11A-11E show one example of an on-screen display feature for the system shown in FIG. 1 and depict a zoom/in and zoom/out option in accordance with the teachings of the present invention.
Figure 11B:
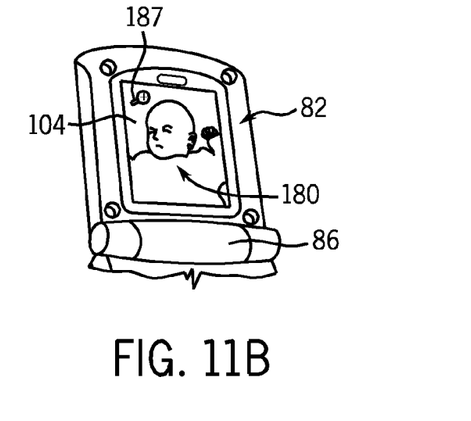

As shown in FIG. 11A, the LCD screen 104 can display status information relative to whether the parent unit 24 is in communication with the child unit 22. With the screen turned on, the parent unit 24 can display information indicating that it is trying to make a connection or is searching for a connection with the child unit 22. In this example, "searching" is displayed on the screen until the child unit 22 is located. At that time a live video feed 180 as depicted generically in FIG. 11B will then appear on the LCD screen 104. Once the connection is established, the connection light 122 in the disclosed example will illuminate green indicating a good connection between the parent unit 24 and the child unit 22.

Figure 11C:
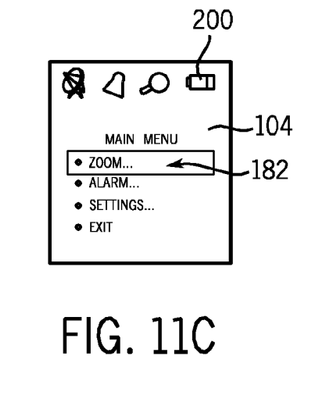

In general, a user can use the OK button 172 in order to access an on-screen display menu 182 as shown in FIG. 11C for selecting functions and features of the system 20 to adjust or set Once the menu 182 is accessed, the user can use the scroll UP/DOWN buttons 174 and 176 to scroll through the various menu choices. Upon landing on an appropriate desired choice on the display screen, a user can press the OK button 172 to make that selection. FIG. 11C illustrates one of many possible examples of a main on-screen display menu 182. In this example, the options ZOOM, ALARM, SETTINGS, EXIT are displayed on the main menu 182.

Figure 11D:
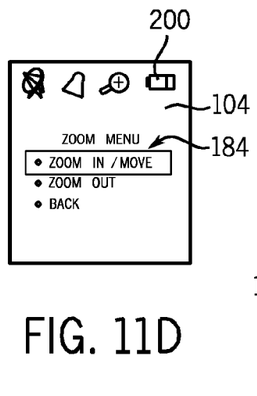
Figure 11E:
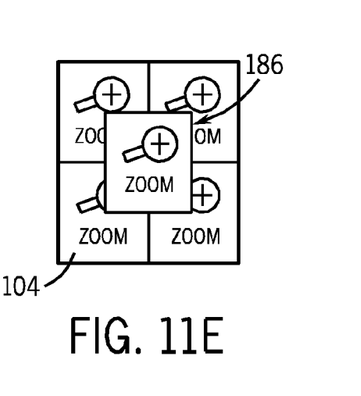
Figure 11F:
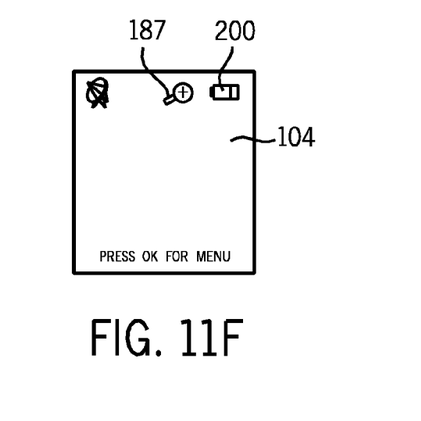

The user can use the scroll buttons 174 and 176 to land on ZOOM and then the OK button 172 to select the ZOOM option from the main menu. As shown in FIG. 11D, a ZOOM menu 184 will then appear on the LCD screen 104. In this example, the ZOOM menu 184 includes a ZOOM IN/MOVE option, a ZOOM OUT option, and a BACK option. A user can select any one of these options using the scroll UP/DOWN buttons 174 and 176 as before. As depicted in FIG. 11E if a user selects the ZOOM IN/MOVE option, a new image can then appear on the on-screen display showing an array of selectable pan regions 186 available to zoom in on. As before, once a user determines the particular pan region option, the user can manipulate the scroll UP/DOWN buttons 174 or 176 select the option. When the appropriate selection is made, the user can press the OK button 172 to select that option. Once selected, a new screen as shown in FIG. 11F can appear with a ZOOM icon 187 that indicates to a user that the image is larger or that the ZOOM feature is activated.

The ZOOM icon can either remain on the screen as the live video image 180 reappears or can be hidden when the live video image 180 replaces the on-screen display after a period of time. To change the ZOOM setting, the user can press the OK button 172 to return to the main menu 180. The user can then go through the steps of choosing from the on-screen display menu options as before.

In an alternate example, the real time video image can be continuously displayed as background or in a portion of the screen along with the functional information of the on-screen display feature. The real time image can also change size, i.e., zoom, as a selection is made to let a user know which selection they have made and its affect on the image. The on-screen display information can also be overlaid directly on the real time video image, as shown in FIGS. 4 and 11B with the ZOOM icon 187 appearing on the screen 104.

As will be evident to those having ordinary skill in the art, the variety of options and parameters available within the parent unit microprocessor can vary considerably and yet fall within the spirit and scope of the present invention. Further, the information displayed on-screen can also vary considerably, depending upon the options presented and the features of the device. These features can include, but are certainly not limited to displaying the current time, setting that current time, adjusting or setting brightness of the on-screen display, setting a video timer to turn the parent screen off and/or to turn off the screen on the child unit, changing language for the menu, adjusting sound volume from the parent unit speaker, and the like.

Figure 12:
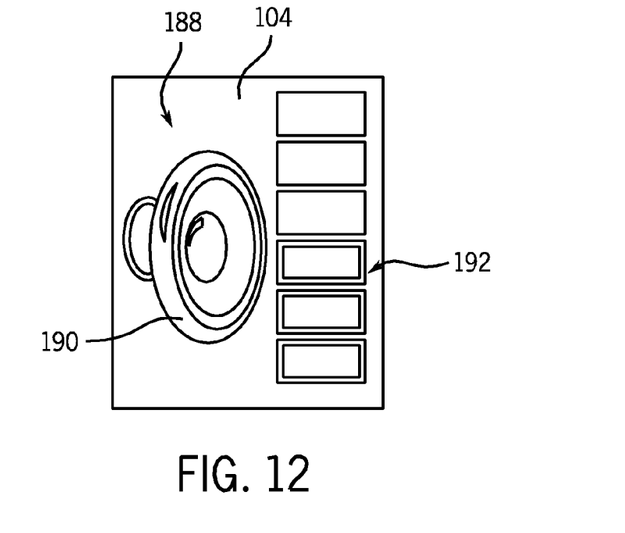
FIG. 12 shows another example of an on-screen display feature for the system shown in FIG. 1 and depicting a speaker volume adjustment display option in accordance with the teachings of the present invention.

In an alternative example shown in FIG. 12, the on-screen display can work in conjunction with one or more of the various buttons on the parent unit. For example, the user can depress one of the volume UP/DOWN buttons 132a or 132b and a volume adjust image 188 can appear on the LCD screen 104. The user can adjust the volume using the side edge buttons 132a, 132b or, alternatively, the scroll UP/DOWN buttons 174, 176. In this example, a speaker icon 190 appears on the screen to indicate that one or more characteristics of the audio signals can now be adjusted. Such characteristics can include sound volume adjustment for the speaker, adjustment of a minimum decibel threshold for the sounds being monitored before the speaker emits any sound, or the like. In this example, a volume level bar 192 also appears in the on-screen display. The bar 192 can be used to indicate the adjustment level. Upon completion of adjusting the sound level, the caregiver can press the OK button 172 to return to the live video image 180. In another alternative as shown in FIG. 11F, the on-screen display can be used to supplement other functions of the parent unit 24. In this example, a battery status indicator 200 is provided that shows the battery charge level. This can be used in place of or in conjunction with the battery charge level light 126 previously described. Clearly other information can also be displayed with the on-screen display feature, if desired.

Use of the on-screen display feature on a baby monitor system 20 can reduce the number of switches, buttons, and devices on the parent and child units, and particularly on the parent unit. It also can reduce the number of mechanical components provided inside the housing of the unit associated with each of the buttons and switches. For example, in prior art devices volume control often requires a switch or roller-type potentiometer, as does a brightness adjustment using the same type of switch. The features can be replaced by the on-screen display feature and the multi-function button arrangement 170 of the present invention. A channel selection switch is typically provided on a conventional unit to select among a plurality of available operation channels. In the disclosed example, the on-screen display can be used in place of the traditional, dedicated slide switch. The microprocessor 156 can be programmed to display the available channels and the multi-function button arrangement 170 can be used to select the appropriate channel in place of a conventional slide switch. Similarly, the on-screen display feature disclosed herein can be used in place of conventional buttons for turning the video screen on and off, if desired.

Conventional video baby monitor systems that are currently known use one of several existing analog video formats. One such format is the National Television Standard Committee (NTSC) analog video format. Overlaying text or images on top of the analog video image requires additional hardware. In the disclosed example, these problems are avoided by using digitally encoded audio and video transmission. The microprocessor 156 can format and modify the video before it is sent to the screen and can be manipulated to select between showing the video image captured by the camera on the child unit or showing on-screen display menus and images. The transmitter 152 and receiver 154 in the disclosed example thus can be digital devices or each unit can employ an analog-to-digital converter to provide appropriate digital signal information.

Although certain video baby monitor systems, method, and devices have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A video baby monitor system comprising:
   a child unit having a back-up battery, a video camera, a microphone, and a transmitter configured to transmit video signals representing video images sent from the camera and audio signals representing sounds sent from the microphone;
   a parent unit having a receiver for receiving the video signals and the audio signals, a video screen for displaying the video images, and a speaker for emitting the sounds,
   wherein the child unit is configured to operate on primary power from an external power source and to operate on back-up power from the back-up battery source, and wherein the monitor system is configured to switch from the primary power to the back-up power and to deactivate at least one video function upon detecting a loss of the primary power.

2. A video baby monitor system according to claim 1, wherein the child unit includes one or more infrared emitters that can operate in conjunction with a night vision function that allows the video camera to capture images in low ambient light, and wherein the system is configured to deactivate each infrared emitter upon detecting the loss of primary power.

3. A video baby monitor system according to claim 2, wherein each infrared light emitter includes a plurality of infrared light emitting diodes.

4. A video baby monitor system according to claim 2, wherein the child unit has an ambient light sensor that turns on each infrared light emitter upon detecting a low level threshold ambient light, and wherein each infrared light emitter is not activated if the low level threshold is detected while the child unit is operating on the back-up power.

5. A video baby monitor system according to claim 1, wherein a part of the child unit is configured to switch from the primary power to the back-up power.

6. A video baby monitor system according to claim 1, wherein a part of the child unit is configured to detect whether the primary power is available or unavailable.

7. A video baby monitor system according to claim 1, wherein a part of the child unit is configured to switch back to the primary power and to reactivate the at least one video function upon detecting that the primary power is regained.

8. A video baby monitor system according to claim 1, wherein the child unit transmits a notification signal to be received by the parent unit upon detecting the loss of primary power.

9. A video baby monitor system according to claim 8, wherein the parent unit emits an audible alarm from the speaker upon receiving the notification signal.

10. A video baby monitor system according to claim 8, wherein the parent unit emits a visual alarm upon receiving the notification signal.

11. A video baby monitor system according to claim 1, further comprising:
    a microprocessor that processes audio data and video data relating to the audio signals and the video images, wherein the microprocessor is instructed to stop processing the video data when the loss of primary power is detected.

12. A video baby monitor system according to claim 11, wherein the microprocessor continues to process the audio data when the child unit is operating on either the primary power of the back-up power.

13. A video baby monitor system according to claim 1, wherein both the child unit and the parent unit have a microprocessor that processes audio data and video data relating to the audio signals and the video images, wherein both of the microprocessors stop processing the video data when the loss of primary power is detected.

14. A video baby monitor system according to claim 11, wherein the microprocessor is in the child unit.

15. A video baby monitor system according to claim 1, wherein the monitor system is configured to turn off the camera upon detecting the loss of primary power.

16. A video baby monitor system according to claim 15, wherein the monitor system is configured to turn the camera back on upon detecting a resumption of the primary power.

17. A video baby monitor system according to claim 1, wherein the monitor system is configured to permit manual override such that the child unit can transmit video signals and the at least one video function can be activated to operate on the back-up power.

18. A method of reducing power consumption in a video baby monitor system, the method comprising:
    connecting a child unit to an external power source, the child unit having a back-up battery, a video camera, and a transmitter for transmitting video signals;
    operating the child unit on the external power source;
    detecting a power loss when the external power source fails;
    automatically switching to the back-up battery to operate the child unit; and automatically deactivating at least one video function upon switching to the back-up battery.

19. A method according to claim 18, wherein deactivating the at least one video function includes automatically turning off the video camera.

20. A method according to claim 18, wherein deactivating the at least one video function includes automatically turning off an infrared light emitter of a night vision function that allows the video camera of the child unit to capture images in low ambient light.

21. A method according to claim 18, further comprising:
transmitting a notification signal to the parent unit upon switching to the back-up battery.

* * * * *